United States Patent [19]
Rabe

[11] Patent Number: 5,168,623
[45] Date of Patent: Dec. 8, 1992

[54] TUBE PULLER TOOL ASSEMBLY

[75] Inventor: George B. Rabe, Sparta, N.J.

[73] Assignee: Foster Wheeler Energy Corporation, Clinton, N.J.

[21] Appl. No.: 745,778

[22] Filed: Aug. 16, 1991

[51] Int. Cl.$^5$ ............................................. B23P 19/04
[52] U.S. Cl. ...................................... 29/726; 269/48.1
[58] Field of Search ................. 29/726, 727, 235, 244, 29/255, 280; 269/48.1

[56] References Cited

U.S. PATENT DOCUMENTS

| | | | |
|---|---|---|---|
| 3,369,287 | 2/1968 | Brochetti | 29/252 |
| 3,507,028 | 4/1970 | Stellatella | 29/726 |
| 3,742,186 | 6/1973 | Finkel et al. | 269/48.1 |
| 3,835,520 | 9/1974 | Sismore | 29/726 |
| 4,208,061 | 6/1980 | Morawski | 269/48.1 |
| 4,214,362 | 7/1980 | Beard | 29/726 |
| 4,369,569 | 1/1983 | Armstrong, Jr. et al. | 29/726 |
| 4,679,315 | 7/1987 | Overbay | 29/726 |
| 4,793,056 | 12/1988 | Kurokawa et al. | 29/726 |
| 4,831,703 | 5/1989 | Wilhelm et al. | 29/727 |
| 4,959,899 | 10/1990 | Martin | 29/726 |

Primary Examiner—Irene Cuda
Attorney, Agent, or Firm—Marvin A. Naigur

[57] ABSTRACT

A tube puller tool assembly for extracting tubes from a tubesheet of heat exchangers. The tool assembly includes an actuator cylinder unit attached to a guide cylinder, having a piston rod attached to a tapered mandrel for expanding multiple fingers of a collet member firmly against the tube inner surface. The collet is initially urged into contact with the tapered mandrel surface by a compression spring provided between the piston rod and collet member, except forward movement of the collet relative to the mandel is limited by a retainer ring in the guide cylinder. In use, the tool assembly is first pressurized to place the collet and mandrel members in an extended forward position, then the tool is inserted into a tube to be pulled, with a guide cylinder being abuted against the tubesheet. The tool is then pressurized to retract the piston and mandrel and thereby radially expand the collet fingers firmly into the tube. Increased actuator cylinder pressure results in withdrawal of the tube from the tubesheet. The actuator cylinder is then depressurized, the withdrawn tube is removed from the tool, and the procedure is repeated for each tube being pulled.

12 Claims, 4 Drawing Sheets

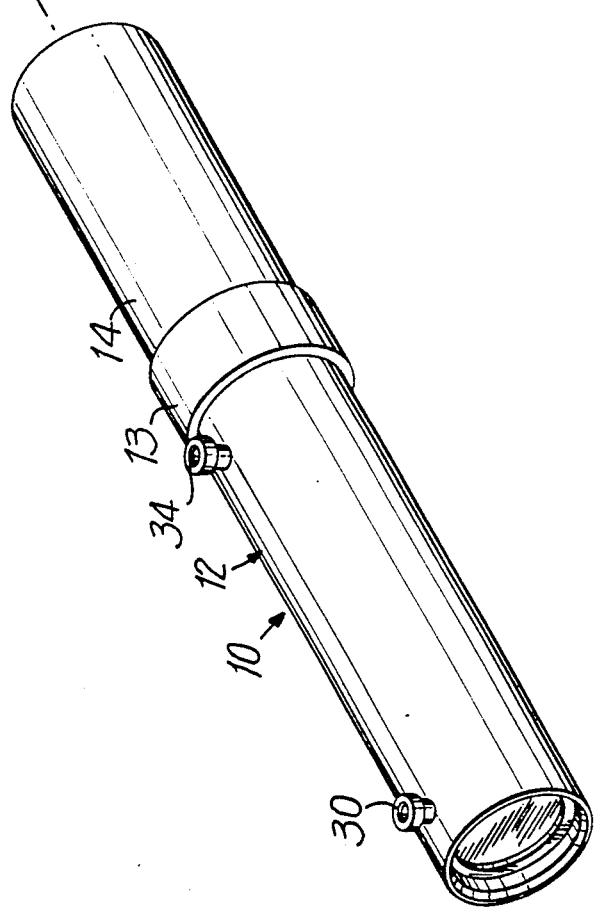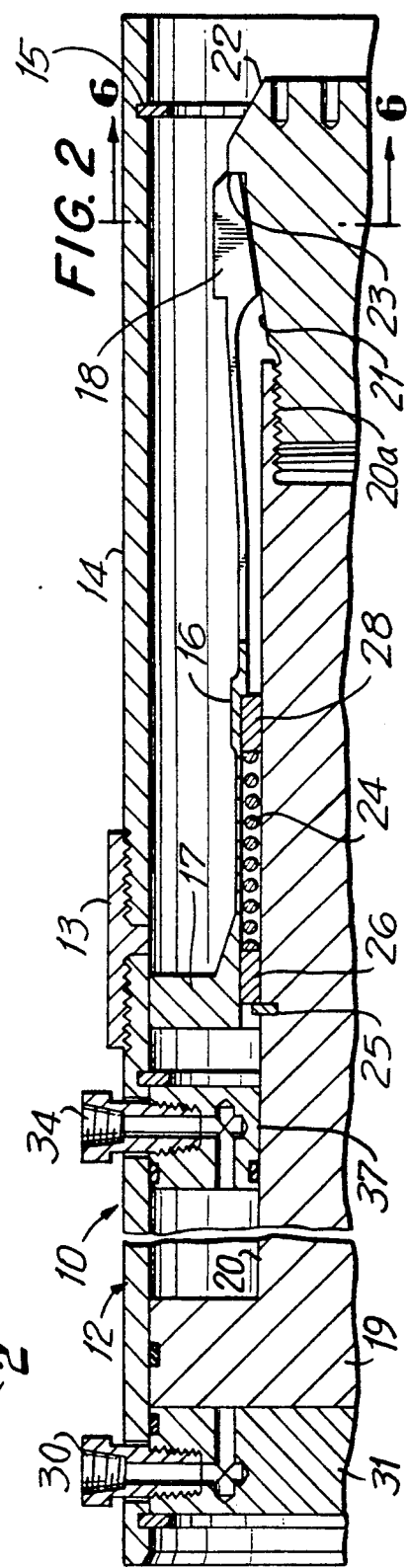

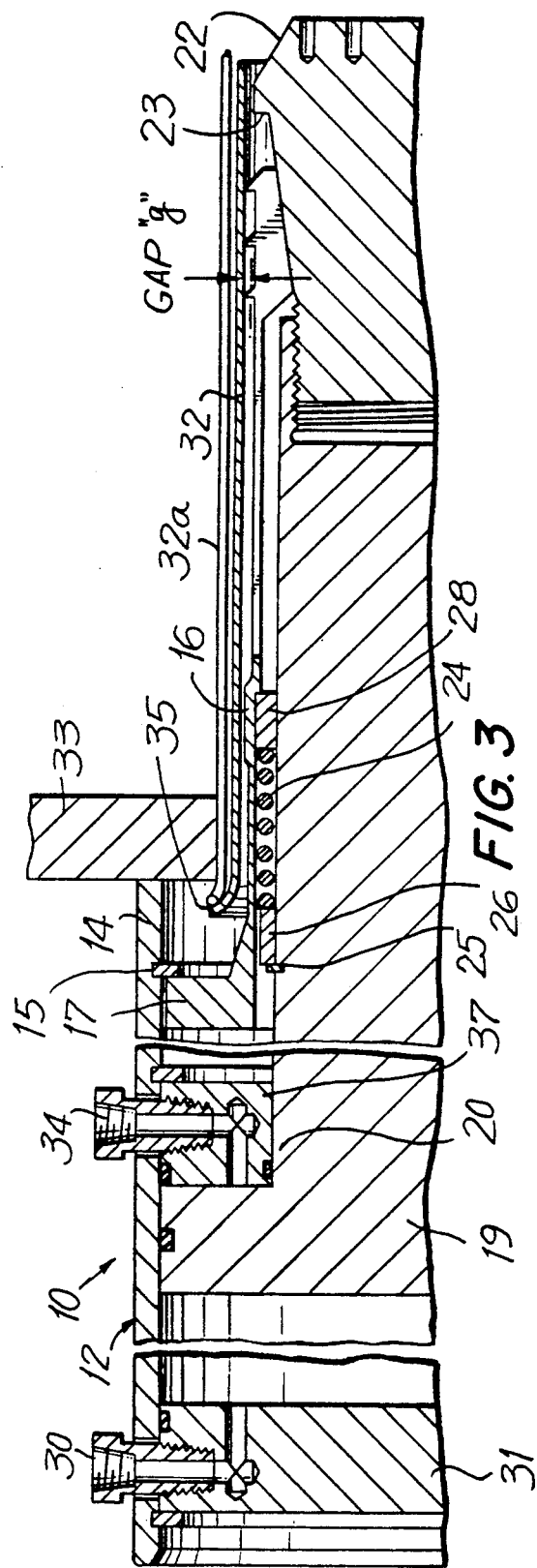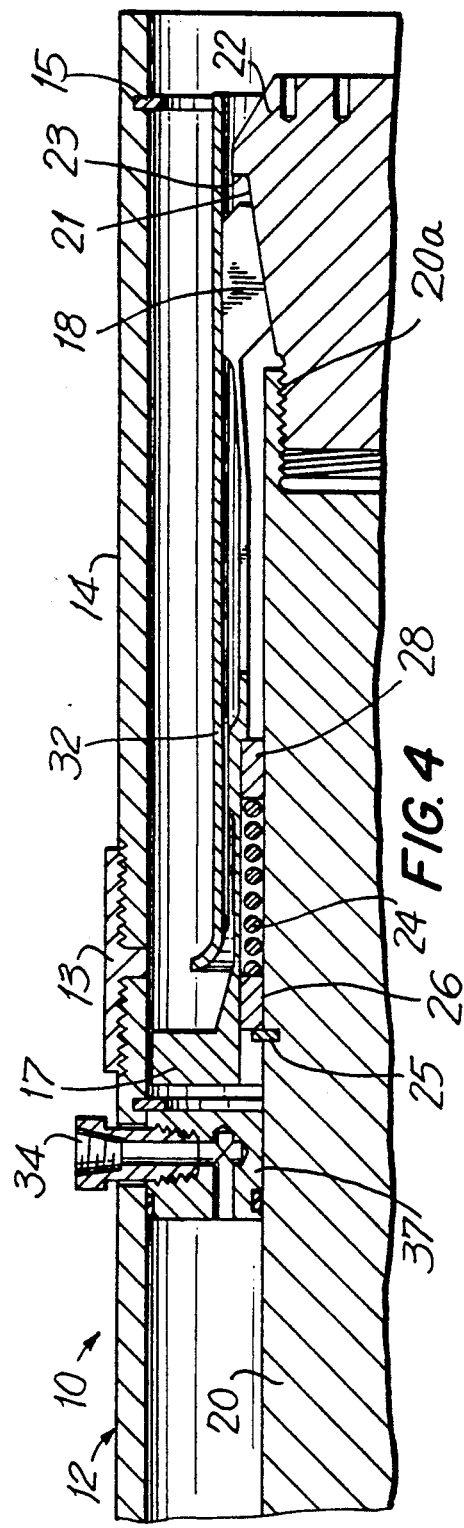

TUBE PULLER TOOL ASSEMBLY

BACKGROUND OF INVENTION

This invention pertains to a tube puller tool assembly adapted for use in removing tight-fitting tubes from a structure such as a tube sheet of a heat exchanger, and to a method for operation of the puller tool assembly for tube removal.

Various tube pulling devices have been developed for extracting tight-fitting tubes from tube sheets of tubular heat exchangers. Such devices generally utilize a tubular housing to be placed in abutment with a tube sheet, so that a gripping member extending therefrom is inserted into and grips a tube being extracted. For example, U.S. Pat. No. 3,507,028 to Stellatella discloses a hydraulic tube puller arranged for being placed in abutment with a tube sheet and utilizes a spring-activated externally serrated end gripping member which extends into and grips a tube to be pulled, somewhat similar to the present invention. U.S. Pat. No. 3,369,287 to Brochetti and U.S. Pat. No. 4,369,569 to Armstrong et al discloses a tube pulling apparatus utilizing expandable gripping jaws and an expansion mandrel each attached to a piston actuator. U.S. Pat. No. 4,214,362 to Beard discloses a tube gripping means having a draw bar with an enlarged head portion protruding beyond a collet and having compression springs all adapted for withdrawing tubes from a support wall. Also. U.S. Pat. No. 4,679,315 to Overbay discloses a tube plug remover which includes an enlarged expanding member sized to force multiple fingers outwardly into tight engagement with inner walls of a plug to be withdrawn from a tube. However, these known tube pulling devices have various disadvantages which have now been advantageously overcome by the tube puller tool assembly of the present invention.

SUMMARY OF INVENTION

This invention provides a tube puller tool assembly having an elongated configuration and includes parts suitable for effectively extracting tight sleeves fitting or tubes from rigid structures, such as from tube sheets in condensers or heat exchangers. The tube puller tool assembly includes an actuator cylinder unit with dual pressurizable ports, and has an elongated collet guide cylinder provided at its forward end and adapted to abut against a tube sheet, with the guide cylinder being attached rigidly onto the pressurizable hydraulic actuator cylinder unit. The actuator cylinder unit includes an axially-movable piston attached to a piston rod which extends into the guide cylinder. A collet member is slidably mounted on the piston rod of the actuator cylinder unit and within the guide cylinder, With the collet member having a rear flange and an expandable front end portion. A tapered mandrel member is adjustably attached to the piston rod forward end, with the tapered mandrel member being located within the collet member expandable front end portion. A compression spring is provided concentrically around the piston rod between it and the collet member, so as to provide an axial spring acting to retain the collet member expandable portion engaged with a tapered portion of the mandrel.

The collet member expandable portion is provided with multiple fingers or jaws, each having an inner surface tapered to match the mandrel tapered surface. The expandable collet fingers each have an outer surface formed in either of two designs or shapes. A first collet finger shape includes circular teeth around its periphery and adapted for biting into the inner surface of a sleeve or tube being pulled. A second collet finger design has a heavily knurled cylindrical outer peripheral surface on the collect fingers, with the expandable collet fingers having the knurled construction usually being preferred.

This invention also includes a method for withdrawing tight-fitting sleeves or tubes from a tube sheet or similar rigid structure. During such use of the tube puller tool assembly, the actuator cylinder disengage rear port is first pressurized so as to extend the collet member and mandrel forwardly so that the collet flange contacts a retainer ring in the guide cylinder outer end. The expandable collet and mandrel are then inserted into a tube in a tube sheet, with the guide cylinder forward end being placed so as to abut against the tube sheet. The actuator cylinder engagement forward port is then pressurized, while the guide cylinder is held against the tube sheet and the mandrel and collet fingers are held within the tube, and the tapered mandrel is withdrawn by the actuator cylinder piston rod, causing the collet fingers to expand and firmly engage the inside surface of a sleeve or tube being removed. The compression spring holds the collet fingers against the mandrel while the collet fingers are being spread apart. The collet fingers will be fully engaged with the sleeve or tube inside surface, before the mandrel stop flange reaches the collet finger ends. At this time, the actuator cylinder pressure is increased until an axial force is applied sufficient to withdraw the sleeve or tube from the tube sheet.

After the sleeve or tube has been removed from the tube sheet, the actuator cylinder disengage port is again pressurized and the collet member is moved forward into contact with the collet retainer, during which time the stop mandrel will move forward and release the expanded collet fingers, thus releasing the Withdrawn sleeve or tube from the tool assembly.

This tube puller tool assembly and method is useful for pulling sleeves or tubes having inside diameters within the range of 1.0–3.0 inches. During use, the actuator cylinder is usually pressurized with hydraulic fluid at pressures up to about 1500 psig.

BRIEF DESCRIPTION OF DRAWINGS

The invention will be further described with reference to the following drawings, in which:

FIG. 1 is a rigid general perspective view of the tube puller tool assembly according to the invention;

FIG. 2 shows a cross-sectional view of the tube puller assembly taken at lines 2—2 of FIG. 1;

FIG. 3 shows a cross-sectional view of the tube puller assembly but with the collet and mandrel members extended forwardly and inserted into a tube sleeve ready to be actuated to expand the collet fingers for pulling the sleeve;

FIG. 4 shows the puller tool assembly in a retracted position with a fully removed tube sleeve attached thereto;

DESCRIPTION OF INVENTION

Figure 6:
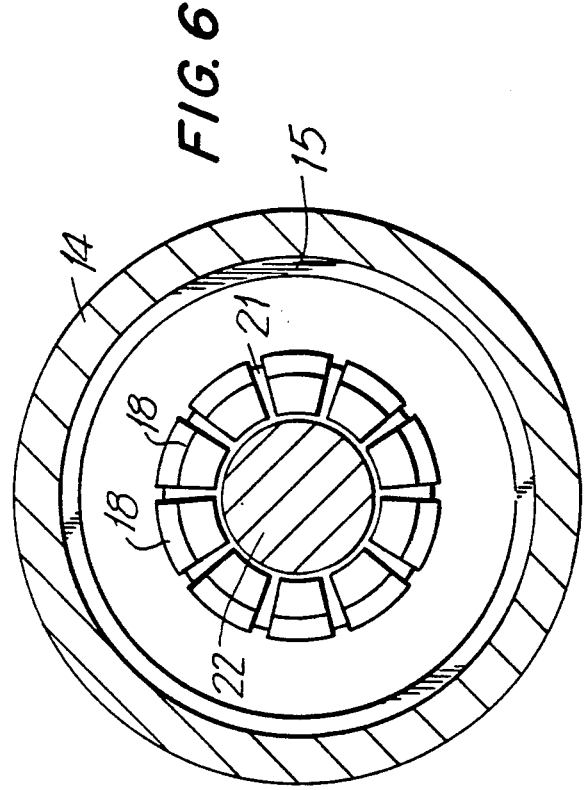
FIG. 6 shows a cross-sectional view of the collet and mandrel taken at section 6—6 of FIG. 2, and FIGS. 7 and 8 show alternative configurations for the collet member.

As generally shown in FIGS. 1 and 2, tube puller tool assembly 10 includes a hydraulic actuator cylinder unit 12 which is rigidly attached at its forward end by suitable means such as a ring nut 13 to an elongated guide cylinder 14 having an inner retainer ring 15 located near its forward end. The guide cylinder 14 surrounds an elongated expandable collet member 16, which has a rear flange 17 which is guided within the cylinder 14 and includes a front expandable portion consisting of multiple expandable fingers or jaws 18. The expandable jaws 18 are equally spaced apart as is best shown in FIG. 6. The jaws 18 should number at least six and need not exceed twelve, with 8–10 jaws being preferred. Actuator cylinder unit 12 includes piston 19 and an elongated piston rod 20, which is adjustably attached at its forward end to a mandrel 22 having a tapered outer surface 21 and a stop surface 23. The piston 19 is retained between a rear plug member 31 connected to pressurizable rear port 30, and a forward plug member 37 connected to forward pressurizable port 34.

The mandrel 22 is attached at its inner end to the piston rod 20 by threaded connection 20a. The expandable collet member 16 is biased forwardly or toward the tapered mandrel 22 by a compression spring 24, Which is axially compressed between the piston rod 20 and the collet member 16 by a ring 26, which is supported by a retainer ring 25 attached to piston rod 20, as shown in FIG. 2. Also, a collet member inner ring 28 is provided within the collet 16 in contact with the other or forward end of the compression spring 24. A suitable lubricant such as a grease is usually used between the close-fitting and load bearing parts of the tool, particularly between collet fingers 18 and the tapered surface 21 of mandrel 22.

The puller tool assembly 10 is practical for pulling sleeves or tubes having inside diameters of 1.0–3.0 inches The heavy load bearing members of the tool assembly are made of hardened chrome alloy steel to prevent deformation and excessive wear. For larger tool assemblies used for pulling 2–3 in. diameter tubes, the lower stressed elements of the actuator cylinder and guide cylinder can be made of aluminum to save weight.

FIG. 3 shows the tube puller tool assembly 10 after hydraulic pressure has been applied to the actuator cylinder 12 at rear or disengage port 30. With the tool assembly 10 in this position, the tapered mandrel 22 and expandable collet 16 are both extended forwardly and collet rear flange 17 is bottomed out against the collet retainer ring 15, and the piston rod 20 of hydraulic cylinder 12 is fully stroked forwardly. This position causes the spring 24 to be compressed further, and it is in this position that the maximum compression load is developed on spring 24. An engagement adjustment for the tapered mandrel 22 and the outer surface of collet fingers 18 relative to the inner diameter of a sleeve or tube 32 which is to be pulled or withdrawn is usually made at this time. The mandrel 22 is screwed into the piston rod 20 by threads 20a until the outer surface of collet fingers 18 are adjusted so as to provide a radial gap "g" of 0.005–0.015 inch between the fingers 18 outside diameter and the inner surface of a tubular sleeve 32 to be removed from a tube or a tubesheet.

FIG. 3 shows the mandrel and expandable collet members of tube puller tool assembly 10 adjusted for removing a sleeve 32 from a tube 32a in a tubesheet 33 of an air heater. The tool assembly can also be effectively used for removal of tight-fitting tubes 32a directly from a tubesheet 33. The removal procedure for a sleeve includes the following method steps:

(a) With the tool assembly 10 removed from a tube, pressurize the cylinder disengage rear port 30 from a suitable hydraulic fluid pressure source (not shown) so as to extend the tapered mandrel 22 and surrounding collet member 16 to its forward or fully extended position.

(b) With the disengage port 30 still pressurized, position the tool assembly 10 outer end within the sleeve 32 as shown in FIG. 3, with the guide cylinder 14 being held against the tubesheet 33 face.

(c) Vent the cylinder disengage port 30, then pressurize the actuator forward port 34, causing the piston rod 20 to recede and tapered mandrel 22 to be withdrawn relative to the collet member 16. The mandrel tapered outer surface 21 spreads the collet fingers 18 until they engage the sleeve 32 inside surface. The compression spring 24 holds the collet rear flange 17 against the retainer ring 15 while this occurs. Due to proper adjustment of radial gap "g", the collet fingers 18 become fully engaged against the sleeve 32 inside surface before the collet finger outer ends contact the mandrel stop flange 23. FIG. 3 shows the general relative position of the collet fingers 18 and mandrel stop 23 before pulling of the tube sleeve 32 from tubesheet 33.

(d) After the collet fingers are fully engaged against the sleeve 32 inner wall, the hydraulic cylinder pressure at forward port 34 is increased until an axial force sufficient to remove the sleeve 32 is applied to it. This axial rearward force must be sufficient to overcome the friction force created between the sleeve 32 and surrounding tube 32a, and to break any tack welds 35 which may exist between the sleeve and tube ends. FIG. 4 shows the tool assembly 10 with a fully removed sleeve 32 surrounding collet member 16.

(e) The sleeve 32 is removed from the tool assembly 10 by again pressurizing the disengage rear port 30, which will again move the collet flange 17 into contact with the collet retainer ring 15 similarly as shown in FIG. 3, after which the mandrel 22 will continue moving forward relative to collet member 16, thereby releasing the expanded collet fingers 18. At this point, the withdrawn sleeve 32 will slide from the puller tool collet 16.

Figure 5:
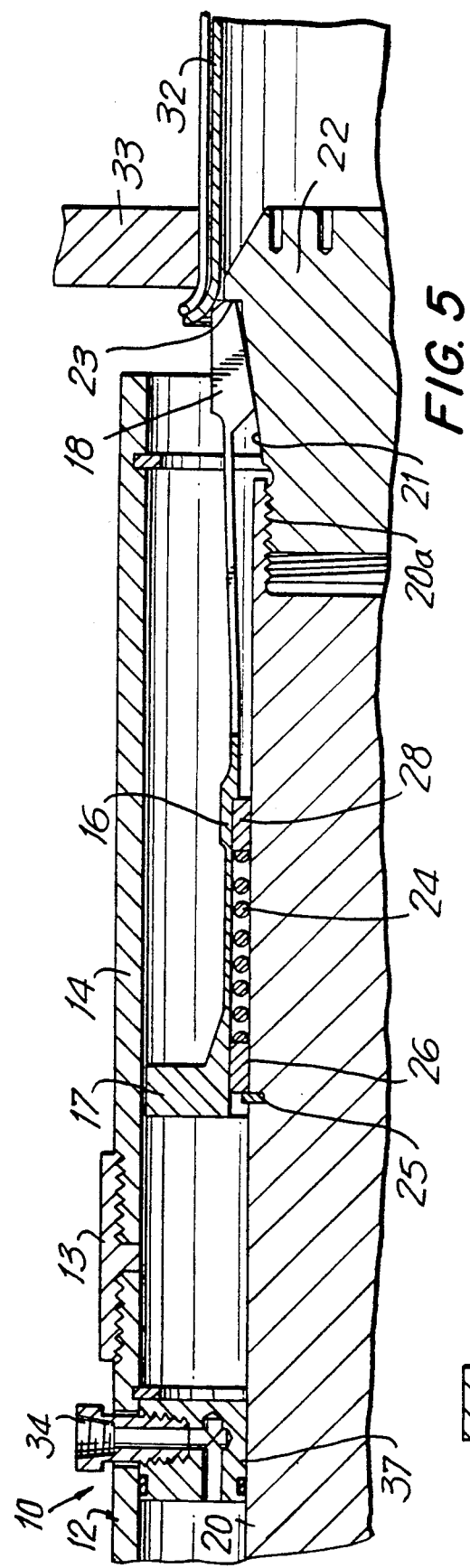
FIG. 5 shows the tube puller tool assembly ready to be inserted into an alternative tube sleeve.

Whenever external space for pulling a sleeve or tube is limited, the collet member 16 can be driven into the sleeve 32 by using the following alternative procedure. Starting with a partially actuated tool assembly and with the tool supported as generally shown in FIG. 5, pressurize the actuator cylinder disengage rear port 30 to extend the mandrel 22 and collet member 16 forwardly. When the forward end of tapered mandrel 22 enters the sleeve 32, the collet fingers 18 will contact the sleeve end and will stop. The mandrel 22 will continue moving forward, thereby compressing the spring 24. When this happens, the collet 18 fingers will move down the tapered surface 21 of mandrel 22 and will slide into the sleeve 32. When the tool assembly is fully disengaged as shown in FIG. 3, the collet member 16 will be loose in the sleeve 32 and the guide cylinder 14 can then be moved into contact with the tubesheet 33. The tool assembly 10 can then be fully pressurized and the sleeve 32 can be removed as described above.

The compression spring 24 which pushes the expandable collet member 16 into engagement with the mandrel 22 tapered surface 21 serves two purposes, which are:

With the puller tool in the fully disengaged position as shown in FIG. 2, the spring 24 holds the collet member 16 against the collet retainer ring 15 during the initial stage of operations, while the mandrel 22 is forcing the collet fingers 18 against the sleeve 32 inner surface.

After the collet fingers 18 are locked onto the sleeve 32 inner surface, the compressive load in the collet fingers is limited to the load in the spring 24, and all of the hydraulic cylinder force is transferred from the mandrel though the collet finger and into the sleeve or tube being pulled.

The unique design features of this tube puller tool assembly 10 include the compression spring 24 being located between the collet member 16 and the piston rod 20 attached to the tapered mandrel 22, so that the collet finger and mandrel configuration develops sufficient radial force to provide, through friction and tube shear strength, adequate axial rearward pulling force for removing the sleeve or tube. The collet fingers 18 must not slip on the sleeve 32 inside surface. However, undersired excessive radial outward force by the collet fingers will yield the sleeve outwardly in hoop tension. If this occurs, the sleeve 32 will become locked into the surrounding tube; or if a tube end is being removed it will not pass through the hole in the tubesheet 33. For successful withdrawal of sleeves or tubes from a tubesheet, the collet finger outside diameter and mandrel cone angle, the coefficient of friction between them, the surface area of the finger outside perimeter which contacts the sleeve or tube end inside surface, and the yield strength of the sleeve or tube end are all important design factors which must be balanced satisfactorily against each other if the puller tool assembly is to work properly. The puller tool design characteristics are balanced so as to provide reliable tube pulling operations with minimal wear and long useful life.

Figure 7:
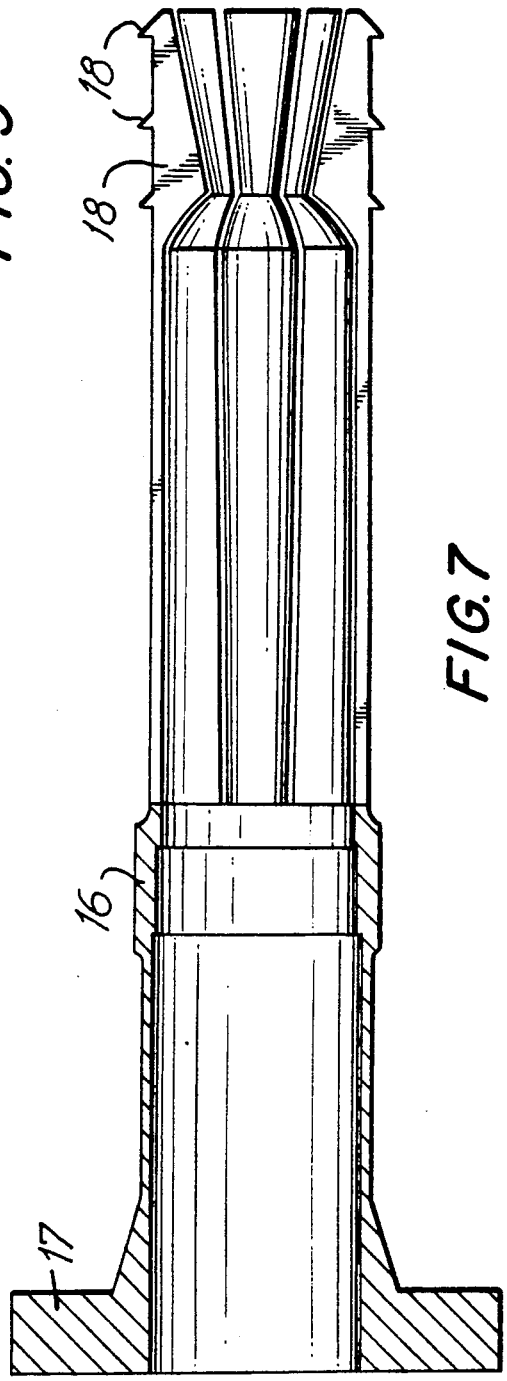
Figure 8:
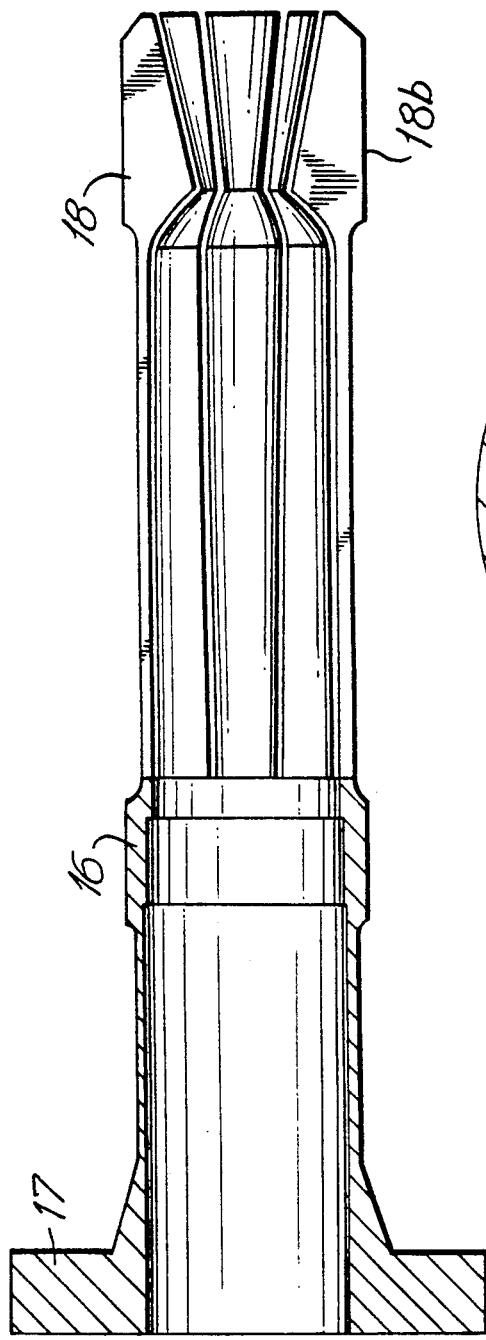

Two designs for collet finger 18 outside diameter have been provided and successfully used. FIG. 7 shows a collet member 16 having fingers 18 with at least two circular outer teeth 18a, which serve to dig into a sleeve or tube inner surface and thereby provide a firm connection between the tool and the sleeve or tube being pulled. FIG. 8 shows an alternative collet member 16 with a heavily knurled cylindrical outer surface 18b on the collet fingers 18, which provides a good frictional connection between the tool and a sleeve or tube being pulled. This knurled design for the outer surface of collet fingers 18 is the preferred collet configuration, because it is less likely to yield a sleeve in hoop tension and provides more than adequate pulling capability.

This invention will be more fully described by the use of the following example, which should not be construed as limiting in scope.

EXAMPLE

A tube puller tool assembly is constructed including a hydraulic cylinder actuator and guide cylinder unit having substantially equal outside diameter and rigidly attached to the actuator forward end. A mandrel having a tapered outer surface and a stop surface is attached to the piston rod outer end by screw threads. A collet member having a rear flanged portion and 6–12 expandable fingers provided at a forward end portion surrounds the piston rod and tapered mandrel, with a compression spring provided between the piston rod and collet member.

Some important parameters of the tube puller tool assembly are as follows:

| Actuator cylinder outside diameter, in. | 3.5 |
| --- | --- |
| Guide cylinder outside diameter, in. | 3.5 |
| Tool overall length extended, in. | 30 |
| Collet flange outer diameter, in. | 3.0 |
| Collet length, in. | 8.0 |
| Number of collet expandable fingers | 10 |
| Collet axial movement, in. | 1.15 |
| Mandrel taper, deg. | 10 |
| Spring axial load, pounds | 100–160 |
| Max. hydraulic pressure required, psig | 1000 |

Although this invention has been described broadly and in terms of a preferred embodiment, it will be understood that modification and variations can be made all as defined by the following claims.

What I claim is:

1. A tube puller tool assembly having an elongated configuration and parts suitable for being partially inserted into and extracting tubes from a rigid structure, the tool comprising:

an actuator cylinder unit which is rigidly attached at a forward end to an elongated guide cylinder, said actuator cylinder unit including an axially-movable piston attached to a piston rod having a forward end, said guide cylinder being adapted to abut against a rigid structure; a tapered mandrel member threadably attached to the forward end of said piston rod, said mandrel member being located coaxially within said guide cylinder; a collet member having a flanged rear portion and an expandable front end portion provided within said guide cylinder, said collet member being slidably mounted on said piston rod and said mandrel member; and a compression spring located coaxially between said piston rod and said collet member, said compression spring being attached at its rearward end to the piston rod and attached at its forward end to the collet member, whereby said tapered mandrel member and attached collect member can be inserted into a tube to be withdrawn and the tapered mandrel moved by said piston and rod axially rearwardly so as to expand the collet member front portion into firm contact with the inside surface of a tube to be extracted from the rigid structure.

2. The tool puller assembly of claim 1, wherein said guide cylinder has a collet retainer ring provided near its forward end, said retainer ring serving to limit forward movement of said collet member relative to said mandrel member before the collet member is inserted into a tube to be pulled.

3. The tube puller tool assembly of claim 1, wherein the actuator cylinder has substantially the same outside diameter as said guide cylinder unit.

4. The tube puller tool assembly of claim 1, wherein said tapered mandrel has a concentric shoulder surface provided at its forward tapered end, which shoulder contacts and limits forward movement of said collet member.

5. The tube puller tool assembly of claim 1, wherein said mandrel member an outer surface which is tapered at an angle of 8°-12° with the mandrel centerline.

6. The tube puller assembly of claim 1, wherein said collet member front end portion consists of 6-12 expandable fingers, each finger having an inner surface tapered to mate with the mandrel tapered surface.

7. The tube puller of claim 6, wherein said expandable fingers each have an outer surface containing multiple teeth.

8. The tube puller of claim 6, wherein said expandable fingers each have a knurled outer surface.

9. The tube puller tool assembly of claim 1, wherein the collet expandable outer portion has an outside diameter which is 0.010-0.030 inch smaller than the inside diameter of a sleeve or tube being pulled.

10. The tube puller assembly of claim 1, wherein said actuator cylinder unit is pressurizable up to 1500 psig. pressure.

11. The tube puller assembly of claim 1, wherein said collet member is sized to be inserted into tubes having inside diameters of 1.0-3.0 inches.

12. A tube puller tool assembly having an elongated configuration and parts suitable for being partially inserted into and extracting tubes from tube sheets, said tool assembly comprising:

an actuator cylinder unit which is rigidly attached at a forward end to an elongated guide cylinder, said actuator cylinder unit including an axially-movable piston attached to a piston rod having a forward end which extends into the guide cylinder, said guide cylinder being adapted to abut against a tube sheet;

a tapered mandrel member threadably attached to the forward end of said piston rod of said actuator cylinder, said mandrel member being located coaxially within said guide cylinder;

a collet member having a flanged rear portion and a front end portion consisting of 6-12 expandable fingers provided within said guide cylinder, said collet member being slidably mounted on said piston rod and said mandrel member, each expandable finger having an inner surface tapered to mate with said mandrel member tapered outer surface; and a compression sping located coaxially between said piston rod and said collet member, said compression spring being attached at its rearward end to the piston rod and attached at its forward end to the collet member, whereby said tapered mandrel member and attached collet member can be inserted into a tube to be withdrawn and the tapered mandrel moved by said piston and rod axially rearwardly so as to expand the collet member multiple fingers into firm contact with the inside surface of a tube to be extracted from a tubesheet.

* * * * *